Figure 1:
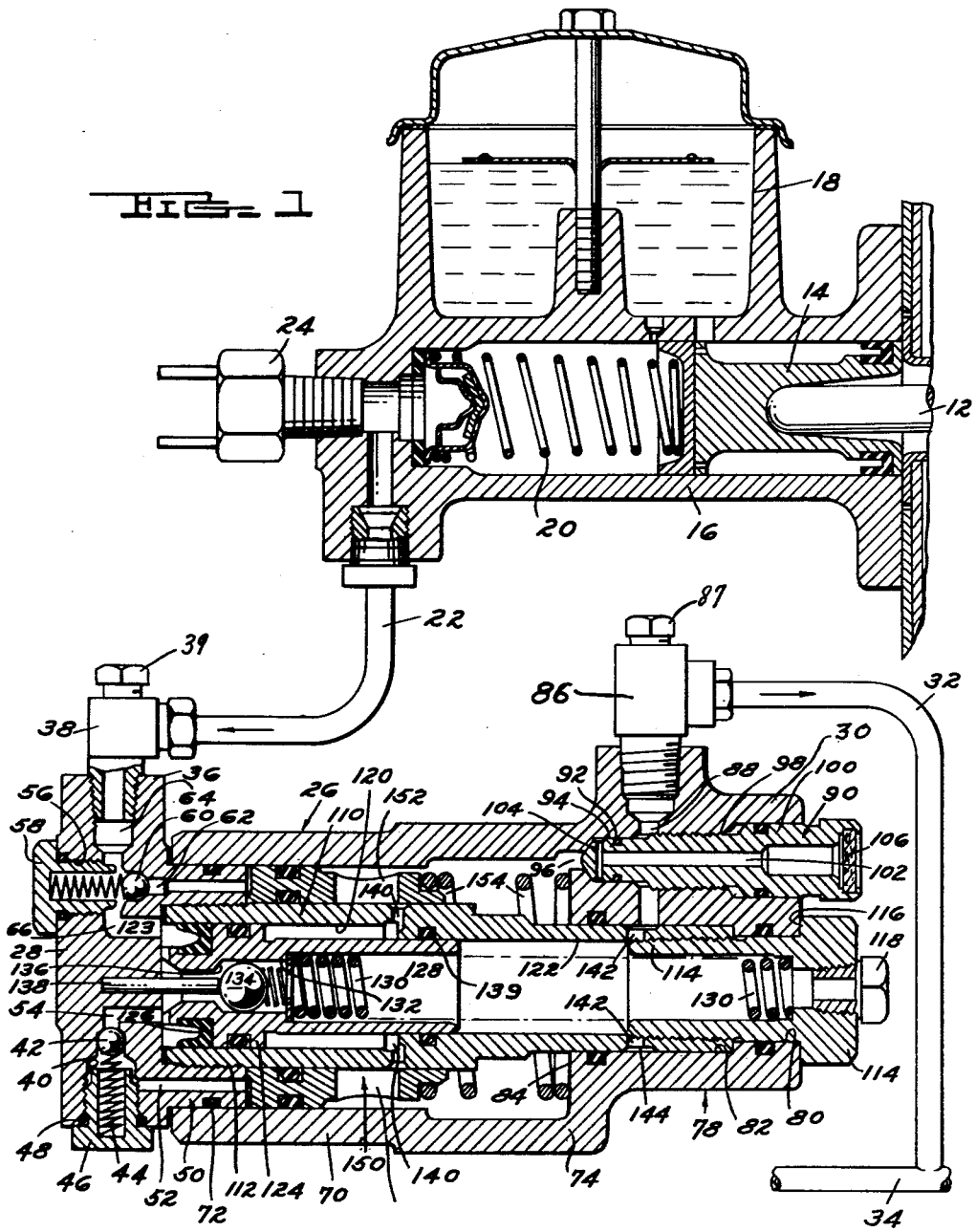

Nov. 28, 1961  A. J. JANSSON  3,010,283
FLUID PRESSURE BRAKING SYSTEM
Filed Nov. 28, 1958  2 Sheets-Sheet 1

INVENTOR.
AXEL J. JANSSON
BY
Barnes, Kisselle, Raisch & Choate
ATTORNEYS

Nov. 28, 1961   A. J. JANSSON   3,010,283
FLUID PRESSURE BRAKING SYSTEM
Filed Nov. 28, 1958   2 Sheets-Sheet 2
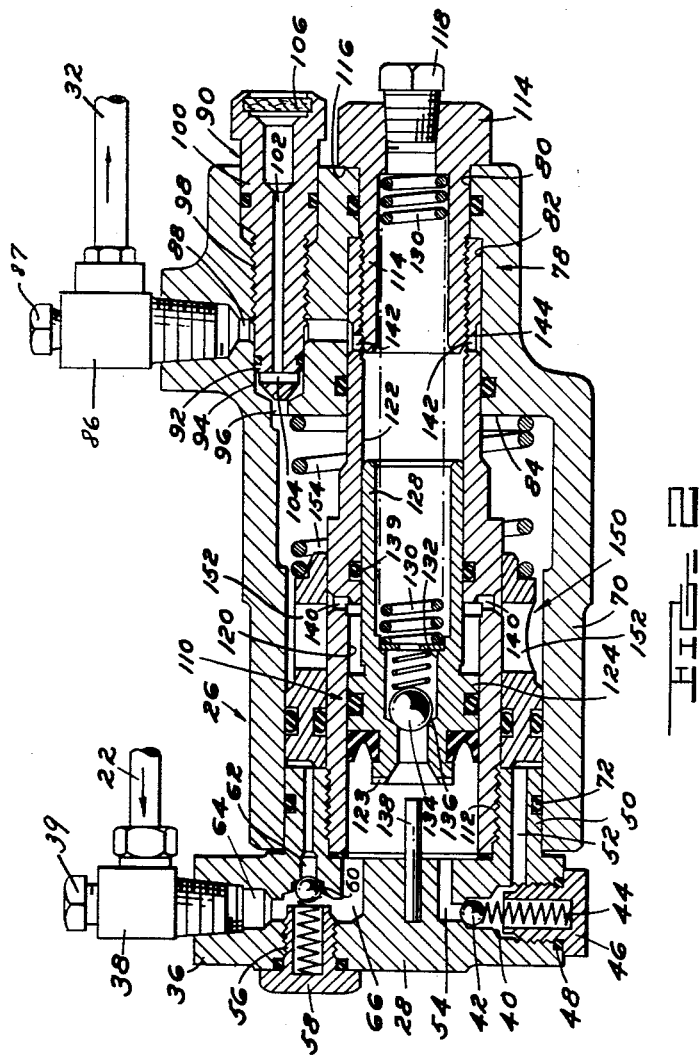
INVENTOR.
AXEL J. JANSSON
BY
Barnes, Kisselle, Raisch & Choate
ATTORNEYS

United States Patent Office 3,010,283
Patented Nov. 28, 1961

3,010,283
FLUID PRESSURE BRAKING SYSTEM
Axel J. Jansson, Detroit, Mich., assignor to Hydroease Corporation, Detroit, Mich., a corporation of Michigan
Filed Nov. 28, 1958, Ser. No. 777,060
8 Claims. (Cl. 60—54.5)

This invention relates to a fluid pressure braking system and more particularly to fluid pressure boosters for such systems. Reference is made to my application, Serial No. 518,897, filed June 29, 1955, now abandoned, wherein I have disclosed a brake booster, this application being a continuation-in-part of the aforesaid co-pending application.

The present invention is an improvement on said previously filed disclosure embodying some of the features thereof and a number of improvements thereover.

It is an object of the present invention to provide a booster system which is formed of parts which are easily assembled and constructed. It is also an object to provide a booster system which can be adjusted so that the brake system can be bled in the normal fashion so that garage mechanics will not be confused by the presence of the booster in the system.

It is a further object to provide a construction which permits easy filling of all of the necessary chambers and passages during the installation or at any other time in the history of the vehicle on which it is used when it becomes necessary to fill the brake lines.

Another object of the invention is the provision of a unique relief valve and accumulator which insures return of any relief liquid into the system without loss. A further object and advantage of the unit is its adaptability to use in power brake systems.

Other objects and features of the invention relating to details of construction and operation will be apparent in the following description and claims.

Drawings accompany the disclosure and the various views thereof may be briefly described as:

FIGURE 1, a sectional view of the master cylinder and booster showing the parts in the "at rest" position.

FIGURE 2, a sectional view of the booster mechanism showing the "brake-on" position.

Referring to the drawings, a brake pedal rod 12 actuates a piston 14 of a master cylinder 16. Reservoir 18 provides fluids for the master cylinder which acts against a spring 20 to drive liquid under pressure through an outlet pipe 22. At the end of the master cylinder is a stop light pressure switch 24. Suitably mounted on a vehicle frame, preferably adjacent the master cylinder, is the booster assembly 26, having a primary cylinder head end 28 and a secondary cylinder head end 30. The secondary cylinder head end has an outlet pipe 32, leading to the brake lines 34 which are connected to the individual wheel cylinders.

Referring to the details of construction of the brake booster shown particularly in FIGURE 1, it will be seen that the primary cylinder head end 28 is substantially cylindrical in shape with a radial nipple 36 threaded to receive a connection 38 for pipe 22. Radially opposite the nipple 36 is a threaded bore and check valve seat 40 for receiving a check ball 42, held in place by a spring 44, recessed in a hollow cap 46, sealed suitably by an O-ring 48. Extending from the primary head end 28 is a smaller cylindrical extension 50 which associates with cylinders of the assembly in a manner to be later described.

The passage 40 for ball 42 is connected to an axially extending passage 52, leading to the end of the cylindrical extension 50 and also to an interior axial passage 54 leading to the interior of the cylindrical extension 50. Above the center of the head end 28 is a second recess 56 for receiving a sealed spring retainer plug 58 which co-operates with a ball 60 in a seat in the entrance of an axial passage 62, leading also to the interior of the unit. The entrance passage 64 of the unit by-passes the ball 60 and turns to a passage 66, leading to the interior of the construction.

The outer cylinder of the assembly is formed by a straight sleeve 70 which has a fairly snug fit over the cylindrical extension 50 of the primary center head sealed by an O-ring 72. At the secondary end of the assembly, integral with the other end of the tube 70 is the secondary head 30 joined at 74. The secondary end 30 also comprises a substantially cylindrical body portion 78, having a central bore 80 at the outer end which enlarges inwardly to a central bore 82, leading to the flat wall 84. At the top of the secondary cylinder head 78 is a plug 86 threaded radially into the head above a radial passage 88. Intersecting the radial passage 88 is an axial bore which receives plug 90 having three different diameters. Plug 90 has a small end 92 provided with an O-ring which seals in a small bore 94 connected to a passage 96, leading to the surface 84 in the interior of cylinder 70. A threaded central portion 98 of the plug 90 is threaded in an increasing bore in the secondary cylinder head end, and enlarged portion 100 has a sealing relation with the outer end of the bore.

The plug 90 is provided with an axial passage 102, connecting to a transverse passage 104 at the end of plug 90. At the outer end of passage 102 is an air filter plug 106. The inner cylinder of the assembly, which serves to retain the elements in assembly, is formed by a cylindrical member 110 with a stepped bore, having a threaded end 112 received into the cylindrical extension 50 of the primary head. The other end of the cylinder 110 which is ensmalled from the first end, is slidably received in the interior bore of the secondary head, this end being threaded interiorly to cooperate with a supplemental cylinder end which is a hollow spring retaining plug 114 having an outer shoulder 116 which bears against the outer face of the secondary head. The plug 114 has a nipple plug 118 for connection to an outlet pipe if desired. The cylinder 110 has a stepped interior bore, the largest end of which is adjacent the primary head of the assembly and the smallest end of which is adjacent the secondary head. Within the large bore 120 and also telescoping into the small bore 122 is a stepped piston 124 provided with a sealing O-ring in an annular groove and provided also in an annular recess with a sealing member 126. The piston has a skirt portion 128 which slides in the small bore 122; and a spring 130, extending to the end of the bore in plug 114, serves to urge the entire piston assembly to the left toward the primary head.

In an axial recess 132 in the piston 124 is a ball 134 which cooperates with a seal 136. As shown in the drawings, the ball is held off its seat by a central pin 138 seated in the primary head 28. When the piston moves to the right as shown in FIGURE 2, the ball 134 will seat. A suitable O-ring seal 139 surrounds the skirt 128, and it will be seen that the cylinder 110 is provided with radial passages 140. The cylinder 110 is also provided with axial passages 142 and an annular recess 144 adjacent the end of plug 116 to cooperate with the passage 88 below the plug 86.

The cylinder 110 also serves to support an annular relief accumulator piston 150 which has an O-ring sliding sealed relationship with the inside of the cylinder 70 and the outside of the cylinder 110. This piston 150, which has cross passages 152, which cooperate with passages 140 in the inner piston is spring retained to the left as viewed in FIGURE 1 by a spring 154 seated against the surface 84 of the secondary head. The view in FIGURE 2 is similar to that of FIGURE 1 with the exception that the piston 124 is shifted to the left against the pressure of the spring 130.

In the operation, it is believed best to describe the filling of the unit prior to the operation of the unit since this is an important feature of the invention. It will be seen that the parts are retained in assembly by the nipple insert 114 and that wherever necessary, sealing O-rings are provided though they may not have been specifically mentioned. The first step in the filling of the unit is to back out the lockout screw plug 90 five or six turns. The master cylinder is pedalled with short, slow strokes until clear fluid escapes through the lockout screw. During these operations, the master cylinder must be kept full of fluid. The lockout screw 90 is then tightened in and the vents 39 and 87 of plugs 38 and 86 are opened three turns. The master cylinder is stroked slowly until no more air comes out at the filler plugs. Close the inlet vent 39 when clear fluid appears. Repeat the stroking until clear liquid appears at the plug 87. The plug 87 is then tightened and the pedal is stroked slowly until it comes up. Brake fluid can now pass through the booster unit directly from the master cylinder.

In most cases it may not be necessary to bleed the system further but, if desired, each wheel cylinder can be bled to be absolutely sure that no air remains in the system. This can be done in the normal manner as known to garage mechanics at the present time. The final step to place the brake booster in operation is to turn the lock screw plug 90 back one-half to one full turn, thus opening the non-working sides of pistons 124 and 150 to passage 102.

Describing the function of the filter 106 in plug 90, it will be noted that the passage 102 in this plug is connected to space behind the piston 150 and also the space behind the piston 124 which is open to the filter plug 106 through passages 140, 152, 96, 104 and 102. This atmospheric connection permits the pistons 124 and 150 to move freely to the left resisted only by the springs provided. It will be seen that pressure created by motion of the master cylinder 14 will pass through the pipe 22 and through the passages 64 and 66 and past small radial grooves 123 in the piston 124 to the central passage of the pistons surrounding the pin 138. The ball 134 is slightly smaller than the opening 132 so that brake fluid can pass through the inner central opening 122 and through the plug 114 to the brake lines.

When the pressure in the assembly reaches a predetermined point, depending on the setting of the spring 130, the piston 124 will start to move to the right as viewed in FIGURE 1 and as shown in FIGURE 2. The spring behind the ball 134 will close it into the seat 136 and the pressure will then develop behind the small end 128 of piston 124 which is a differential area piston. The ratio of line pressure created by the master cylinder to the pressure in the brake lines is about 1 to 1.75 and this, of course, can be varied if desired. Further pressure on the master cylinder will cause a large increase in the pressure in the brake lines due to the booster operation. Should the pressure reach a point which is equal to the setting of the spring 44, acting on ball 42, there will be a relief action taking place which will drive liquid against the piston 150 through passage 52. Piston 150 can move to the right against spring 154 serving as an accumulator piston for the overflow liquid. Upon release of the master cylinder piston 14, the pistons in the booster will return to the left and any liquid behind the accumulator piston 150 will pass through passage 62 and then pass the ball check 60 to the brake system and the master cylinder. During the high pressure phase, the ball 60 is balanced by high pressure on each side and this remains closed.

Return of the piston 124 to its "at rest" position again opens the ball check 134 so that the brake cylinders are connected to the master cylinder again directly.

Thus, once installed, the booster can be filled by a garage mechanic in exactly the same way he uses to bleed the wheel cylinders plus the manipulation of the plug 90.

What is claimed is as follows:

1. A pressure compounding structure comprising a housing having spaced walls defining an inner cylinder and an outer cylinder surrounding the inner cylinder, said housing having a primary end at one end of said cylinders, said primary end having a pressure inlet passage therein adapted to be connected to a brake operating device, said housing having a secondary end at the other end of said cylinders, said secondary end having an outlet adapted to be connected to a fluid system, said inner cylinder having a stepped bore with the larger portion of said bore adjacent the primary end of said housing, a stepped hollow primary piston in said bore, the area between said cylinders defining an accumulator, a secondary piston in said area between said cylinders, spring means biasing said secondary piston toward the primary end of said housing, said housing having passage means connecting said inlet passage to said bore in said inner cylinder and said space between said inner and outer cylinders, and unidirectional flow means in said passage means permitting flow to said space between the inner and outer cylinders and against said secondary piston when the pressure in said inlet passage exceeds a predetermined value.

2. A device as defined in claim 1 in which said housing includes return-flow passage means in said primary end to pass fluid from said accumulator back to said inlet passage upon reduction of pressure in said inlet passage.

3. A device as defined in claim 2 in which a biased-valve is in said return-flow passage means and is open on one side to inlet pressure and on the other side to accumulator pressure.

4. A device as defined in claim 1 in which the inner cylinder and the primary end of the outer cylinder are formed with interengaging threads, the other end of the inner cylinder being formed with threads, and a threaded plug engaging the threads of said other end of said inner cylinder, said plug having a shoulder bearing against said other end of said outer cylinder.

5. A device as defined in claim 4 in which the wall of said outer cylinder has a telescoping fit with said primary end and is integral with said secondary end.

6. A device as defined in claim 4 in which a spring is interposed between said primary piston and said threaded plug, said threaded plug serving as a spring seat for said spring, said threaded plug having a passageway therein serving selectively as a connection for a brake line.

7. A device as defined in claim 1 in which said primary end includes an air vent opening on the top and a passageway connecting the space behind said primary piston and said secondary piston to said air vent opening, and an air plug in said last-mentioned passageway shiftable to close said space and also shiftable to open said space to said passageway to permit bleeding of said pressure compounding structure.

8. A pressure compounding structure to be used as a brake booster and the like, including an assembly of two cylinders and two cylinder heads, one of said heads comprising, a primary head having a pressure inlet passage, said head having an annular cylindrical flange portion, a secondary head also having an annular cylindrical flange portion facing the first flange portion, an outer cylinder wall telescoping over the flange portion of the primary head and integral with the secondary head, an inner cylinder having a stepped bore, said inner cylinder being threaded at one end into the flange portion of the primary head and being telescopically received in a central bore in the secondary head, a supplemental cylinder end inserted into said secondary end and threadingly received by said inner cylinder, said supplemental cylinder end serving to keep said primary and secondary ends in tight relationship with said cylinders, a differential-area piston in said inner cylinder having one portion to be received in the smaller bore thereof, a spring seated in said smaller portion of said piston at one end and at the other end in said supplemental cylinder end, an annular piston mounted between said inner and outer cylinders adjacent the large end of said smaller cylinder, a spring biased against said secondary end for urging said annular piston toward said primary end, said primary end having an inlet passage leading to said differential piston, said primary head having a passage extending from one side of said annular piston to said inlet passage, unidirectional means in said passage permitting flow to said inlet passage when the pressure in said inlet passage exceeds a predetermined value, said primary end having a relief passage connected at one end to one side of said differential area piston and at the other end to one side of said annular piston, and unidirectional means in said relief passage permitting accumulative flow from said one side of said differential piston to said one side of said annular piston when the pressure in said inlet exceeds a predetermined value.

References Cited in the file of this patent

UNITED STATES PATENTS

| | | |
|---|---|---|
| 2,111,310 | Carroll | Mar. 15, 1938 |
| 2,191,716 | Hunt | Feb. 27, 1940 |
| 2,351,953 | Goepfrich | June 20, 1944 |
| 2,372,015 | Rockwell | Mar. 20, 1945 |
| 2,642,720 | Deardorff | June 23, 1953 |